(12) United States Patent  
Wang et al.

(10) Patent No.: US 8,903,319 B2  
(45) Date of Patent: Dec. 2, 2014

(54) METHOD, SYSTEM AND APPARATUS USING MULTIPLE FEEDBACKS FOR UPLINK CLOSED-LOOP BEAMFORMING

(75) Inventors: Sherwin J. Wang, Towaco, NJ (US); Kenneth Kludt, Bedminster, NJ (US); Phil F. Chen, Denville, NJ (US); Haim Harel, New York, NY (US)

(73) Assignee: Google Inc., Mountain View, CA (US)

( * ) Notice: Subject to any disclaimer, the term of this patent is extended or adjusted under 35 U.S.C. 154(b) by 109 days.

(21) Appl. No.: 13/371,248

(22) Filed: Feb. 10, 2012

(65) Prior Publication Data

US 2012/0208467 A1   Aug. 16, 2012

Related U.S. Application Data

(60) Provisional application No. 61/441,736, filed on Feb. 11, 2011.

(51) Int. Cl.
| | |
|---|---|
| *H04B 1/00* | (2006.01) |
| *H04B 7/00* | (2006.01) |
| *H04B 7/04* | (2006.01) |
| *H04B 7/06* | (2006.01) |
| *H04W 52/42* | (2009.01) |

(52) U.S. Cl.  
CPC ............ *H04B 7/0404* (2013.01); *H04B 7/0634* (2013.01); *H04W 52/42* (2013.01); *H04B 7/0623* (2013.01)

USPC .............................. 455/42; 455/67.16; 455/69

(58) Field of Classification Search  
CPC ............................. H04B 7/0669; H04B 14/006  
USPC .................... 455/42, 67.16, 69, 101, 139, 517  
See application file for complete search history.

(56) References Cited

U.S. PATENT DOCUMENTS

| | | | |
|---|---|---|---|
| 7,245,890 B2 * | 7/2007 | Kumagawa et al. .......... | 455/130 |
| 7,583,981 B2 * | 9/2009 | Suzuki ....................... | 455/562.1 |
| 2011/0176593 A1 * | 7/2011 | Hultell et al. ................ | 375/224 |

* cited by examiner

*Primary Examiner* — Tuan H Nguyen  
(74) *Attorney, Agent, or Firm* — Gottlieb, Rackman & Reisman, PC.

(57) ABSTRACT

A method, apparatus, and system for transmitting and controlling uplink diversity signals in a mobile communication device. While in a soft handoff situation, a mobile communications device may receive a phase feedback signal from a non-serving base station. The mobile device may calculate a modified phase parameter based on the phase feedback signal from the non-serving base station in order to minimize interference with the non-serving base station, for example, by calculating a modified value of a phase difference in a direction opposite to the direction desired by the non-serving base station. In some embodiments of the invention, the mobile device may determine whether to calculate the modified phase parameter in a direction opposite to the direction indicated by the phase feedback signal of the non-serving base station based on a comparison of power feedback signals received from the non-serving and serving base stations.

17 Claims, 4 Drawing Sheets

METHOD, SYSTEM AND APPARATUS USING MULTIPLE FEEDBACKS FOR UPLINK CLOSED-LOOP BEAMFORMING

CROSS-REFERENCE TO RELATED APPLICATIONS

This application claims benefit of U.S. Provisional Patent Application Ser. No. 61/441,736, entitled "USING SINGLE AND MULTIPLE FEEDBACKS FOR UPLINK CLOSED-LOOP BEAMFORMING IN SHO SITUATIONS" filed Feb. 11, 2011, the entirety of which is incorporated by reference herein.

FIELD OF THE INVENTION

This invention relates generally to the field of mobile wireless communications and more specifically to controlling a value of a transmit diversity parameter in a mobile communication device based on feedback from a plurality of base stations.

BACKGROUND OF THE INVENTION

A transmit diversity mobile device may have multiple antenna elements to each transmit a signal, such that the signals combine at a base station, for example, the signals being typically being sent over the same frequency. The signals sent on the respective antennas may differ by a transmit diversity parameter, e.g., a phase difference or a power ratio. The transmit diversity parameter may be modified to perform beamforming so as to optimize reception quality, e.g., minimize signal loss, at the base station. Such determination of the transmit diversity parameter value may be made by the base station based on prior mobile device diversity signals and communicated expressly to the mobile device, i.e., "closed loop" feedback mode, or may be made by the mobile device based on an analysis of signal quality, e.g., based on power control feedback signals received from the base station, i.e., "open loop" mode.

A mobile device may contemporaneously receive feedback signals from multiple base stations, for example, when the mobile device is within range of a plurality of base stations. This is typically referred to as a soft handoff situation. The mobile device is typically programmed to obey the feedback signals of the serving base station, which is typically the base station sending data to the mobile device. However, in a soft handoff situation, obeying feedback signals from the serving base station may cause the mobile device to interfere with non-serving base stations which may be located nearby.

SUMMARY OF EMBODIMENTS OF THE INVENTION

Embodiments of the invention include a method, apparatus, and system for controlling uplink transmit diversity signals in a mobile communication device, in which the mobile device may transmit a first diversity signal using a first value of a phase parameter, receive from a non-serving base station a feedback signal based on the first diversity signal, calculate a modified value of the phase parameter based at least in part on the feedback signal received from the non-serving base station, the modified value modifying the first value of the phase parameter in a direction opposite to a direction indicated by the feedback signal received from the non-serving base station, and transmit a modified diversity signal using the modified value of the phase parameter.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The present invention may be applicable in any communication network between a mobile device and a second communication device, including but not limited to a base station. Networks may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Communication devices in a network may use any suitable multiple access technology, for example, a code division multiple access (CDMA) technology. According to one embodiment, the network may operate according to a CDMA 2000 telecommunications technology that uses a single CDMA channel. As an example, a CDMA 2000 high rate data packet technology, such as the Evolution Data Optimized (EvDO) technology may be used.

The network may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of a network, for example, a mobile communication device or mobile user equipment device (mobile device), may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

The communication network may include one or more mobile or modifying communication devices and one or more other communication devices, for example base stations that communicate via a wireless link. A mobile communication device unit may comprise any device operable to communicate with a base station, for example, a personal digital assistant (PDA), a cellular telephone, a mobile handset, a laptop computer, or any other device suitable for communicating signals to and from a base station. A subscriber unit may support, for example, Session Initiation Protocol (SIP), Internet Protocol (IP), or any other suitable communication protocol.

A base station may provide a mobile communication device access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

According to embodiments of the invention, the mobile communication device may include two or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band. The two signals may propagate along different paths and may reach the receiving communication device or base station with different phases that constructively or destructively interfere. Two or more signals that constructively interfere may exhibit higher diversity gain, or higher relative performance than if the sum of the two signals were transmitted. Two or more signals that destructively interfere may exhibit lower diversity gain, or lower relative performance than if the sum of the two signals were transmitted.

A diversity signal may include two or more signals transmitted contemporaneously on the two or more antenna elements. Diversity signals may be transmitted using a diversity parameter. A diversity parameter may be a parameter or value by which the transmissions on any two antennas differ, for example a difference in transmission phase on the two antennas, or a ratio of transmission power on the two antennas. It will be understood that although examples are provided in the present application pertaining to phase difference between two antennas, the invention is applicable using the same principles to varying any transmit diversity parameter. Although the embodiments described in the present application are described as using two antennas, it will be recognized that the present invention is equally applicable to transmit diversity systems and devices having more than two antennas.

As described more fully below, according to embodiments of the present invention, the mobile communication device may include a processor and a transmit/receive module that calculate and produce one or more signals for transmission over at least first and second antennas.

The value of a transmit diversity parameter may be determined based on a number of feedback schemes, including "open-loop" feedback, in which the mobile device calculates the value based on signal quality feedback signals sent by the base station, which may not necessarily be dedicated to transmit diversity, or "closed-loop" feedback, in which the mobile device calculates the value based on a phase correction or modification feedback signal sent by the base station, e.g., an explicit instruction from the base station to adjust or modify the value of the transmit diversity parameter in a particular direction and/or by a particular amount.

According to embodiments of the invention, modifying a diversity signal may refer to modifying a signal feature or a diversity parameter. For example, a signal may be transmitted by the two antennas using a modified signal feature, or a different value of a transmit diversity parameter than a previous value. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. According to embodiments of the invention, modifying a signal may refer to adjusting, for example, a nominal value of a phase feedback parameter so that two signals have a different relative phase than before signal modifications. In another example, nominal value of a power feedback parameter may be changed or modified.

The quality of one or more recent uplink signals from the mobile device may depend on the changing geometry or position of the mobile device with respect to the base station and through varying propagation conditions. Accordingly, in a closed-loop feedback scheme, a base station may send to a mobile device a transmit diversity feedback signal, e.g., a phase feedback signal, instructing the mobile device to modify or set its value of the transmit diversity parameter. For example, an instruction may include a phase feedback parameter, commanding a mobile device to modify the diversity signal's relative phase difference. A base station may expressly instruct the mobile device how to modify the phase difference so as to improve reception, based on the quality of past or recent uplink signals from the mobile device. The transmit diversity feedback signal may be the desired value, or a differential value relative to the current value, and may be sent as the actual value, or as a code from a codebook. The mobile device may use the base station's instructions to determine a modified phase parameter.

In some embodiments of the invention, a base station may send a power feedback signal, e.g., a reverse link power control signal, commanding the mobile device to increase its transmission power ("power up") or decrease its transmission power ("power down"). In a typical operation, the base station may command a mobile device to power down so as to limit the transmitted power to be no higher than necessary, or power up to increase the transmitted power to overcome fading. The base station may explicitly send the mobile device power feedback signals based on the quality of recent signals sent from the mobile device. If the base station detects high fading or lossy propagation, as may happen if the mobile device is far from a base station, the base station may send a power feedback signal to the mobile device, commanding a power up. Conversely, if the mobile device is within close range of a base station or mid range but at a low data rate, the base station may send a power feedback signal to the mobile device commanding a power down.

As described above, in a soft handoff situation, a mobile device may contemporaneously receive feedback signals, e.g., power control signals or transmit diversity feedback signals, from multiple base stations, for example, when the transmitter is a mobile device within range of a plurality of base stations. It will be understood in the context of the present application, that the determination made by the mobile transmitter that it is in a soft handoff situation is merely shorthand for a situation in which the device is within range of receiving meaningful feedback from more than one base station. The mobile device need not change its serving base station in a soft handoff situation. It is possible within the scope of the present invention that a transmitter may determine that it is in a soft handoff situation and proceed accordingly even when service is not actually being handed off from one base station to another, for example, when the mobile transmitter is stationary and equidistant (power-wise) from two base stations, in which case service need not be handed off, but the device may operate in soft handoff mode. For example, a soft handoff algorithm may include a hysteresis component in order to avoid excessive handoffs. In such a system, even though handoff is not actually performed, i.e., the serving base station is not changed, the presence of feedback signals from a plurality of base stations may be used for beamforming in connection with the present invention.

During soft handoff, the communication network may consider a particular base station within a plurality of base stations to be a serving base station, e.g., the serving base station provides the mobile device with downlink data. The mobile device may make this determination of which base station is the serving base station, for example, based on received instructions from the base station. The mobile device may be in uplink and/or downlink communication with the serving base station. It will be understood that uplink communication refers to information sent by the mobile device toward the base station (e.g., uploads) and downlink communication may refer to information sent by the base station toward the mobile device (e.g., downloads). A communication network may select a serving base station for a mobile device due to, for example, its proximity to a base station or due to the available bandwidth or signal strength of a base station, or the consideration of other factors.

In some embodiments of the invention, during soft handover, a mobile device may be in communication with a serving base station, and yet, a nearby non-serving base station may send feedback to the mobile device. In fact, in some soft handover situations, the serving base station may be further than the non-serving base station, causing the nearby non-serving base station to send power down commands to the mobile device, implying that the mobile device is interfering with the non-serving base station. The mobile device may be required to decrease power, but this may affect performance with respect to the mobile device's communication with the serving base station.

In some embodiments of the invention, a non-serving base station may provide closed-loop feedback to the mobile device by sending a transmit diversity feedback signal, e.g., a phase feedback signal, to the mobile device. As discussed above, such a phase feedback signal may include a value of a phase parameter. According to embodiments of the invention, feedback information from the non-serving base station may be used to minimize interference with the non-serving base station. For example, according to embodiments of the invention, the mobile device may use beamforming to cause the transmit diversity signals to destructively interfere at the non-serving base station, i.e., steer a "null" in the frequency domain toward the non-serving base station. As described below, according to embodiments of the invention, the mobile device may transmit a diversity signal with a modified value of a phase parameter in a direction opposite to the direction indicated by the feedback signal from the non-serving base station.

Figure 1:
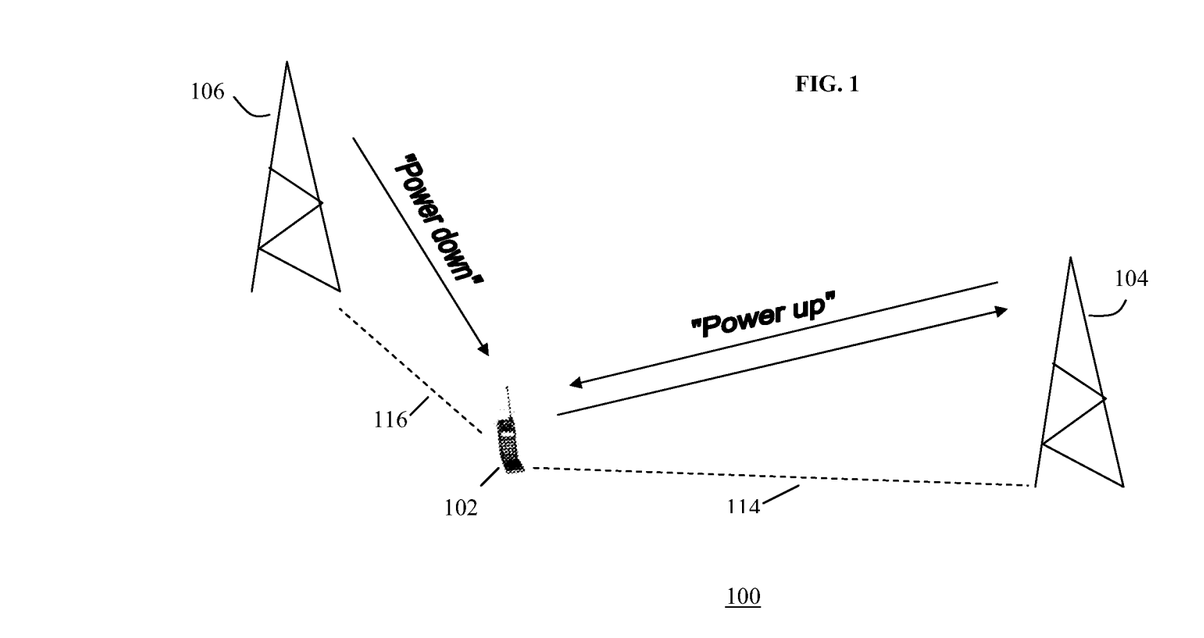
FIG. 1 is a schematic diagram of a mobile transmit diversity system according to an embodiment of the invention.

FIG. 1 is a schematic diagram of a mobile transmit diversity system 100 according to an embodiment of the invention. A mobile device 102 may be in uplink communication with a serving base station 104. As depicted, mobile device 102 may be in a soft handoff situation, i.e., in a vicinity of two base stations, 104 and 106, where base station 106 is a non-serving base station. In the example depicted, the distance 114 between mobile device 102 and serving base station 104 may be greater than distance 116 between mobile device 102 and non-serving base station 106. Since non-serving base station 106 may detect mobile device 102 in close range, non-serving base station may send a power down command to mobile device 102 and possibly a phase feedback signal to increase diversity gain at the non-serving base station 106. Mobile device 102 may continue to be in uplink and/or downlink communication with serving base station 104 even though it may be more distant. The communication network may choose serving base station 104 because, for example, non-serving base station 106 may be overloaded with serving other mobile communication devices in the area, or for any other reasons. According to embodiments of the invention, mobile device 102 may calculate a value of a transmit diversity parameter for transmitting a diversity signal to the serving base station 104 based at least in part on the phase feedback received from non-serving base station 106, so as to perform "null" beamforming or steering a "null" toward the non-serving base station, thereby decreasing interference. In some embodiments of the invention, mobile device 102 may calculate a modified value of the phase parameter in an opposite direction to the direction indicated by the phase feedback signal from the non-serving base station 106.

Figure 2:
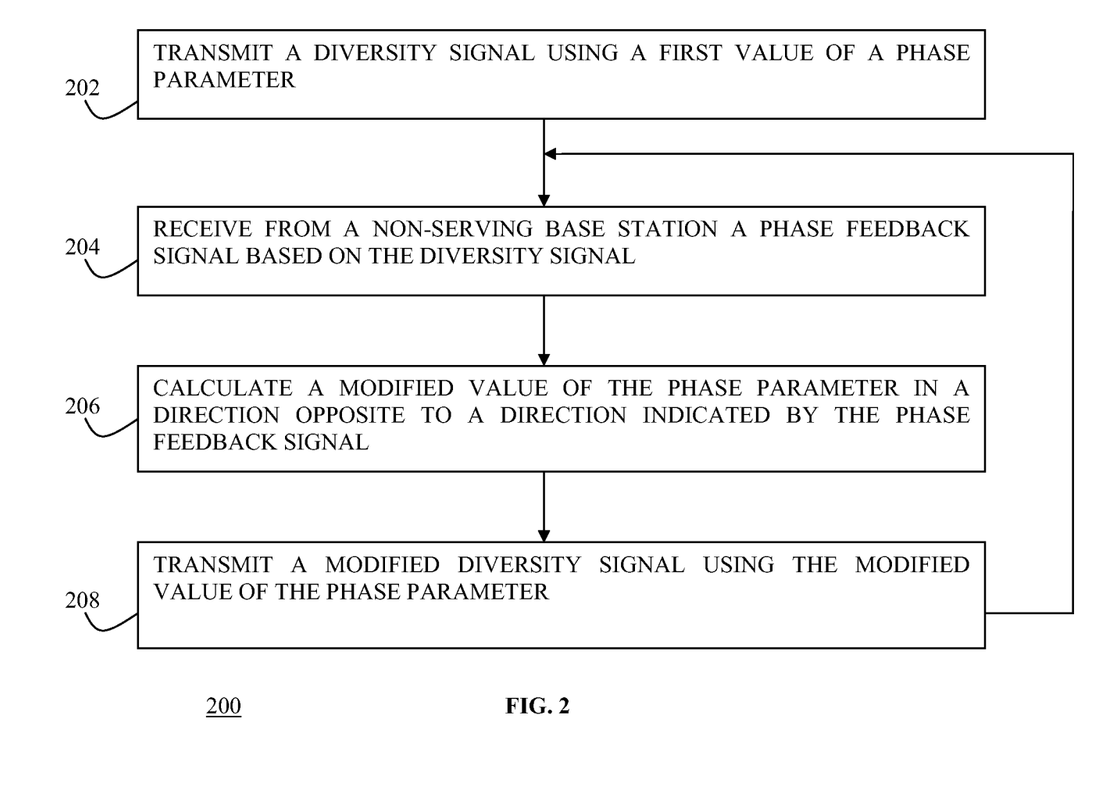
FIG. 2 is flowchart of a method for closed-loop transmission, according to an embodiment of the invention.

FIG. 2 depicts a flowchart of a method 200 according to an embodiment of the invention. In soft handoff mode, a mobile device may be in uplink communication with a serving base station. At block 202, the mobile device may transmit a diversity signal using a first value of a phase parameter. A non-serving base station may send a power feedback signal to the mobile device, indicating that the mobile device is in soft handoff situation. If the power feedback from the non-serving base station is a power down command, and the serving base station sends a power up command to the mobile device, the mobile device may assume that the non-serving base station is receiving the signal at a stronger level, e.g., lower fading loss, than the serving base station, perhaps because of greater physical proximity to the non-serving base station, or for any other reason.

At block 204, the mobile device may receive a phase feedback signal from a non-serving base station, based on the quality of the diversity signal. The phase feedback signal may include or contain a value for a phase parameter, which may be calculated by the non-serving base station to increase diversity gain at the non-serving base station if the mobile device transmitted a diversity signal with the desired value of the phase parameter.

At block 206, the mobile device may calculate a modified value of the phase parameter. The modified value of the phase parameter may be calculated in a direction opposite to the direction indicated by the phase feedback signal from the non-serving base station. In an embodiment of the invention, the modified value may differ from the value of the phase parameter requested by the base station by 180°. For example, if the non-serving base station sends a feedback signal indicating a desired value of a phase parameter of +90°, the mobile device may calculate a modified value of the phase parameter as −90°. In another embodiment of the invention, calculating the modified value of the phase parameter may include modifying the first phase value by adding a phase step in a direction opposite to that of the desired value of the phase feedback signal received from the non-serving base station. According to an embodiment of the invention, the phase step may be constant. In another embodiment of the invention, the magnitude of the phase step may be determined as a fraction of the value of a phase parameter indicated by the non-serving base station's phase feedback signal. For example, a mobile device may transmit a diversity signal with a first phase parameter of 0°. If the non-serving base station sends a feedback signal indicating a phase parameter of +90°, the mobile device may use $\frac{1}{10}$ of |30 90°| as the step magnitude, and modify the value of the phase difference by 9° in the opposite direction, i.e., −9°. Other fractions may be used, for example, in some embodiments, the fraction may be greater, e.g., ½, ⅓, ¼, or ⅕ of the phase indicated by the phase feedback signal, or less, e.g., 1/15 or 1/20 of the phase indicted by the phase feedback signal. Other methods may be used for calculating a modified value of a phase parameter.

It will be understood that the modified value of the phase parameter may be based on the phase feedback from the non-serving base station as well as other feedback parameters. For example, as described below in FIG. 3, in some embodiments of the invention, where both the serving and non-serving base stations provide closed loop feedback, the mobile device may calculate the modified value of the phase difference based on phase feedback provided by both the serving and non-serving base stations, so as to increase constructive interference at the serving base station while increasing destructive interference at the non-serving base station.

At block 208, the mobile device may transmit a modified diversity signal using the modified value of the phase parameter, calculated in block 206.

The method may repeat blocks 204-208. Thus, for example, the modified value of the phase parameter in 208 may become the initial or first value of a phase parameter that is modified again once the null steering method reaches step 208 in a subsequent cycle. Continuing the previous example, a first value of a phase parameter may now be −9°, and the mobile device will have transmitted a diversity signal with a −9° phase difference (202). The mobile device may receive another phase feedback signal from the non-serving base station (204) based on the diversity signal transmitted in 202. The phase feedback signal may again indicate a phase parameter of +90°. The mobile device may calculate another modified phase parameter in the opposite direction of +90°, for example, by taking a step size of 1/10 of |+90°|, resulting in the phase step magnitude of 9° in the opposite direction of +90°, i.e., an additional phase difference step of −9°, resulting in a total phase difference of −18°. Similarly, in a third iteration, if the phase feedback signal from the non-serving base station is again +90°, the modified phase parameter may yield −27°, etc.

In other further iterations, if the non-serving phase feedback signal changes amount or direction, the modified phase parameter may yield a different phase step in a different direction. Continuing the above example, if on a fourth iteration, the non-serving base station may send a phase feedback signal of 180°, in which case, the phase step may be calculated as 18°. Regarding the direction, the direction between the current phase difference, −27°, toward the desired phase difference of 180° is in the negative direction (i.e., toward) −90°). Therefore, modifying the phase parameter in the opposite direction would result in a modified phase parameter of −9°.

Figure 3:
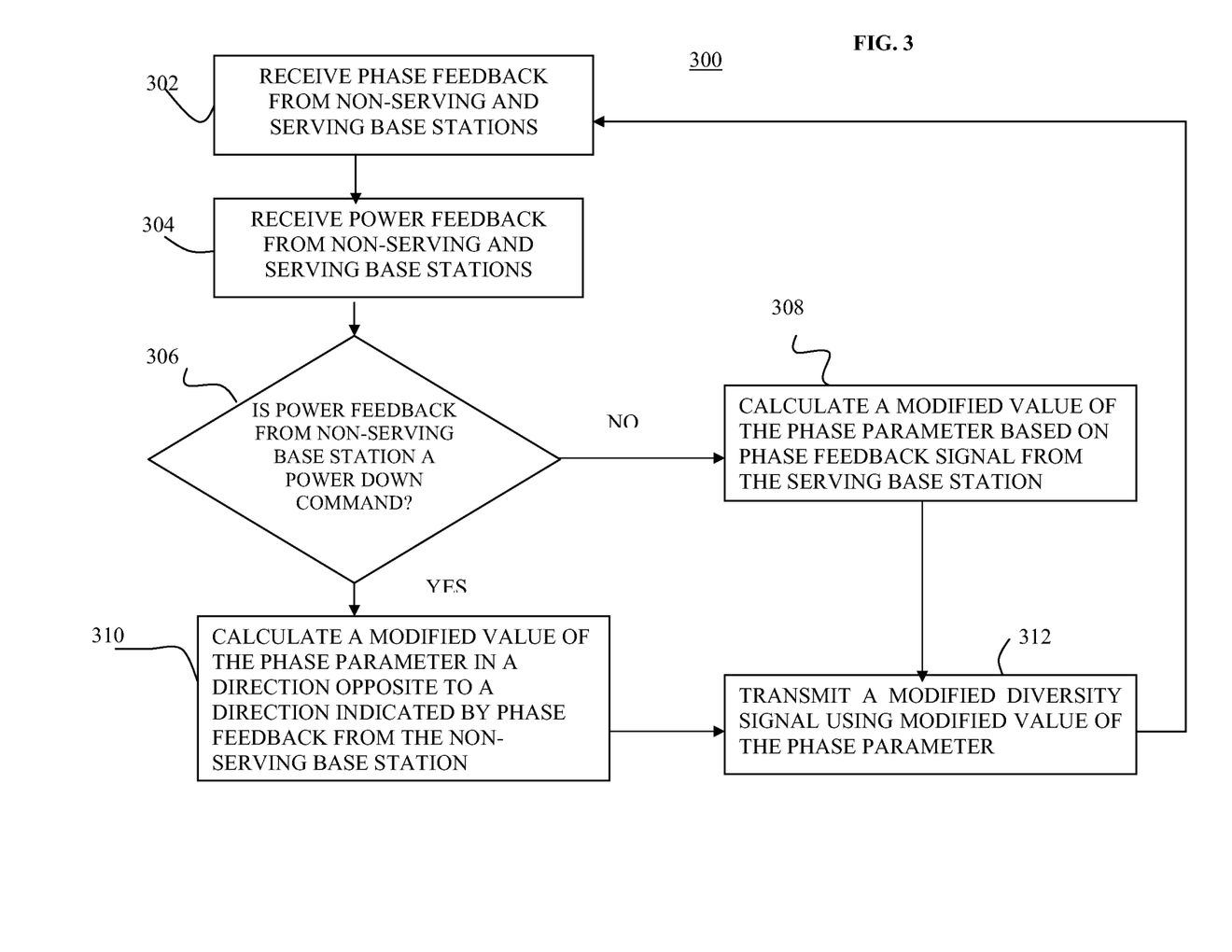
FIG. 3 is a flowchart of a control method for closed-loop transmission based on power feedback from a non-serving base station, according to an embodiment of the invention.

FIG. 3 is a flowchart of a control method 300 for null steering a mobile communication device, according to embodiments of the invention. As discussed above, null steering according to embodiments of the invention may be particularly useful when a non-serving base station is nearer to the mobile device than the serving base station. An indication of relative distance between a mobile device and serving and non-serving base stations may be the power feedback signals sent by serving and non-serving base stations. The mobile device may initially transmit a diversity signal with an initial or first value of a phase parameter.

At block 302, the mobile device may receive phase feedback from serving and non-serving base stations. These phase feedback signals may be based on the diversity signal initially transmitted by the mobile device.

At block 304, the mobile device may receive power feedback from a serving base station and at least one non-serving base station. It will be understood that the order of blocks 302 and 304 in the method is interchangeable.

At block 306, the mobile device may determine whether to steer a null toward the non-serving base station. This decision may be based, for example, on whether the mobile device receives a power down command from the non-serving base station. In addition, if the power feedback signal from the serving base station is a power up, the mobile device may infer that it is nearer to the non-serving base station than the serving base station. In some embodiments of the invention, the mobile device may perform null steering toward the non-serving base station based on receiving a power down from the non-serving base station, regardless of the power feedback signal from the serving base station.

At block 308, if the power feedback received from the non-serving base station is not a power down command, i.e., it is a power up command, the mobile device may determine that steering a null is not necessary, and instead calculate a modified phase parameter based on the phase feedback of the serving base station, without regard to the phase feedback sent by the non-serving base station.

At block 310, upon receiving a power down command from the non-serving base station, the mobile device may calculate a modified value of the phase parameter based at least on the phase feedback sent by the non-serving base station, e.g., in a direction opposite to a direction indicated by the phase feedback signal from the non-serving base station. The calculation of the modified value of the phase parameter may be as described herein, for example, in connection with FIG. 2. Additionally or alternatively, the mobile device may calculate the modified value on phase feedback provided by both the serving and non-serving base stations, so as to simultaneously increase constructive interference at the serving base station while increasing destructive interference at the non-serving base station.

At block 312, the mobile device may transmit an updated diversity signal with the modified value of the phase parameter calculated.

Figure 4:
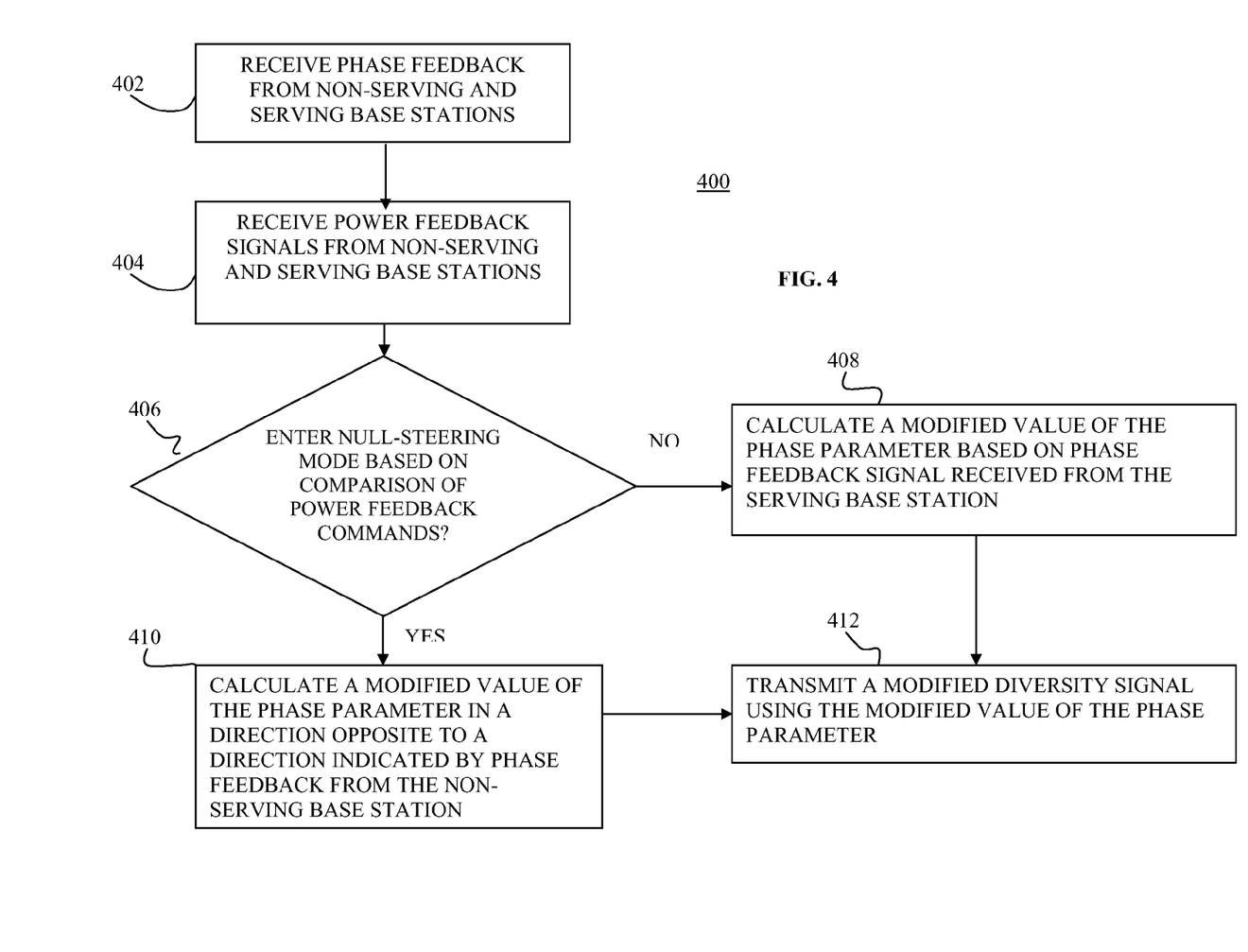
FIG. 4 is a flowchart of a control method for closed-loop transmission, based on a comparison of power feedback from serving and non-serving base stations, according to an embodiment of the invention.

FIG. 4 is a flowchart of a method 400 according to an embodiment of the invention. Power feedback signals received from a base station may vary depending on different variables in the transmission environment, including but not limited to geographic distance from the base station, data rates, and available bandwidths. A change in any of these variables may cause the base station to send different power feedback signals. A mobile device may monitor power feedback from a plurality of base stations and use the comparison to determine whether to steer a null toward a non-serving base station using any of the methods described above, or to operate in a customary beamforming mode.

According to some embodiments of the invention, at block 402, a mobile device may receive phase feedback signals from serving and non-serving base stations. At block 404, the mobile device may receive and monitor a plurality of power feedback signals from non-serving and serving base stations.

At block 406, the mobile device may compare the power feedback signals from the non-serving base station to the power feedback signals received from the serving base station, for example, comparing the respective power down instructions received. If the mobile device determines that more power down commands were received from the non-serving base station than power down commands received from the serving base station, at block 410, the mobile device may perform null-steering or null beamforming, for example, as described in any of the above embodiments of the invention. If not, at block 408, the mobile device may perform customary beamforming, for example, by complying with the phase feedback signals sent by the serving base station.

It will be understood that in some embodiments of the invention, the comparison at block 406 need not be a 1:1 comparison, but may use another ratio. For example, in an embodiment of the invention, the mobile device may compare the power down commands from the non-serving base station and serving base station by calculating a threshold ratio or proportion at which the mobile device will determine to enter null-steering mode. A high ratio or percentage of non-serving power down commands to serving power down commands may indicate a greater likelihood that null steering will be effective and that the mobile device may have entered into a stable environment where the non-serving base station is more likely to stay closer to the mobile device than the serving base station. For example, the threshold ratio may be two power down commands from non-serving base station to one power down command from the serving base station. Thus, for example, in a given period of time, e.g., 250 ms, 500 ms, 750 ms, or 1 sec, if the mobile device receives twice as many power down commands from the non-serving base station as power down commands from the serving base station, the mobile device may determine to enter null-steering mode. If the mobile device receives fewer than the threshold power down commands from the non-serving base station, the mobile device may determine to comply with the serving base station's phase feedback signals.

At block 412, the mobile device may transmit a modified diversity signal using the calculated modified value of the phase parameter.

In some embodiments of the invention, the mobile device may continue to monitor and compare the power down commands received by non-serving and serving base stations during the process of steering nulls toward the non-serving base station. For example, after each transmission of a modified diversity signal with a modified phase parameter, or after a period of time transmitting using the modified phase parameter, blocks 402-412 may be repeated. The mobile device may receive further phase feedback signals, power feedback signals or other diversity feedback from the serving and non-serving base stations. Prior to calculating a further modified diversity signal, the mobile device's processor may again compare the number of power down commands received from the base stations.

In an embodiment of the present invention, the calculation steps of the modified phase parameter may change as the ratio between serving and non-serving power down commands decreases. For example, if the ratio between non-serving and serving power down commands reaches or is near 1:1, the mobile device may alternate between complying with the serving base station's phase feedback signals and calculating a modified phase parameter in the opposite direction specified by the non-serving base station. In another example, calculating a modified phase parameter may involve an initially large phase step away from the non-serving base station's instructions. Upon the next iterations and monitoring of power down commands, calculating a modified phase parameter may involve smaller subsequent phase steps. The same principle may apply to calculating a modified phase parameter based on phase feedback signals from the serving base station (block 410). One iteration may fully comply with the serving base station's feedback, and later iterations may take more gradual steps toward the serving base station's instructions. In some embodiments, the invention may utilize step-track, window, or half-rate perturbation algorithms to reach an optimal modified phase parameter.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of controlling a mobile communication device comprising:
transmitting by a mobile communication device a first diversity signal using a first value of a phase parameter;
receiving from a non-serving base station a phase feedback signal based on the first diversity signal;
receiving from the serving base station a plurality of serving power feedback signals based on the diversity signal;
receiving from the non-serving base station a plurality of non-serving power feedback signals based on the diversity signal;
comparing said plurality of non-serving power feedback signals to said plurality of serving power feedback signals;
determining based on said comparison whether or not to perform said step of calculating the modified value modifying the first value in the direction opposite to the direction indicated by said phase feedback signal;

calculating a modified value of the phase parameter, said modified value modifying the first value of the phase parameter in a direction opposite to a direction indicated by said phase feedback signal; and transmitting a modified diversity signal using the modified value of the phase parameter.

2. The method of claim 1, further comprising:

receiving from the non-serving base station a power feedback signal based on the diversity signal; and determining based on the power feedback signal whether or not to perform said step of calculating the modified value modifying the first value in the direction opposite to the direction indicated by said phase feedback signal.

3. The method of claim 2, further comprising:

receiving from a serving base station a feedback signal based on the diversity signal, wherein the mobile communication device is in uplink communication with the serving base station; and when the determination is made not to perform said step of calculating the modified value modifying the first value in the direction opposite to the direction indicated by said phase feedback signal, then calculating a modified value of the phase parameter based on the feedback signal received from the serving base station.

4. The method of claim 3, wherein:

the feedback signal received from the serving base station is a phase feedback signal; and wherein calculating the modified value based on the feedback signal received from the serving base station comprises calculating the modified value of the phase parameter, said modified value modifying the first value of the phase parameter in the direction indicated by said phase feedback signal received from the serving base station.

5. The method of claim 1, wherein calculating a modified value of the phase parameter comprises:

multiplying a fraction with the value of a phase parameter indicated by the phase feedback signal, resulting in a phase step value; and adding the phase step value to the first value of the phase parameter, in a direction opposite to a direction indicated by said phase feedback signal.

6. The method of claim 1, wherein determining whether or not to perform said step of calculating the modified value in the direction opposite to the direction indicated by said phase feedback signal comprises determining to perform said step of calculating the modified value in the direction opposite to the direction indicated by said phase feedback signal if the number of power down commands received from said non-serving base station is greater than the number of power down commands received from said serving base station.

7. The method of claim 6, further comprising if the number of power down commands received from said non-serving base station is less than the number of power down commands received from said serving base station, then modifying the first value based on a feedback signal received from the serving base station.

8. The method of claim 6, wherein determining whether or not to perform said step of calculating the modified value in the direction opposite to the direction indicated by said phase feedback signal comprises determining to perform said step of calculating the modified value in the direction opposite to the direction indicated by said phase feedback signal if the number of power down commands received from said non-serving base station is greater than the number of power down commands received from said serving base station by a threshold ratio.

9. The method of 8, wherein the threshold ratio comprises a minimum ratio of 4:1.

10. The method of claim 1, wherein calculating said modified value of the phase parameter comprises modifying the first value of the phase parameter so as to differ by 180° from the phase parameter value indicated by said phase feedback signal.

11. A mobile communications apparatus, comprising:

a phase modulator to produce a phase difference between two signals transmitted on first and second antenna, based on a first value; and a processor to receive a phase feedback signal from a non-serving base station and calculate a modified value of the phase parameter, said modified value modifying the first value of the phase parameter in a direction opposite to a direction indicated by said phase feedback signal, wherein the processor is to receive from the serving base station a plurality of serving power feedback signals based on the diversity signal, receive from the non-serving base station a plurality of non-serving power feedback signals based on the diversity signal, compare said plurality of non-serving power feedback signals to said plurality of serving power feedback signals and determine based on said comparison whether or not to perform said step of calculating the modified value modifying the first value in the direction opposite to the direction indicated by said phase feedback signal, and wherein said phase modulator is to further produce a modified phase difference between two signals transmitted on first and second antenna, based on said modified value.

12. The mobile communications apparatus of claim 11, wherein the processor is to:

receive from the non-serving base station a power feedback signal based on the first diversity signal; and determine based on the power feedback signal whether or not to perform said step of calculating the modified value modifying the first value in the direction opposite to the direction indicated by said phase feedback signal.

13. The mobile communications apparatus of claim 12, wherein the processor is to:

receive from a serving base station a feedback signal based on the first diversity signal, wherein the mobile communication device is in uplink communication with the serving base station; and calculate a modified value of the phase parameter based on the feedback signal received from the serving base station, when the determination is made not to perform said step of calculating the modified value modifying the first value in the direction opposite to the direction indicated by said phase feedback signal.

14. The mobile communications apparatus of claim 13:

wherein the feedback signal received from the serving base station is a phase feedback signal; and wherein the processor is to modify the first value of the phase parameter in the direction indicated by said phase feedback signal received from the serving base station.

15. The mobile communications apparatus of claim 11, wherein the processor is to calculate the modified value of the phase parameter by:

multiplying a fraction with the first value of the phase parameter, resulting in a phase step value; and adding the phase step value to the first value of the phase parameter, in a direction opposite to a direction indicated by said phase feedback signal.

16. A mobile transmit diversity system, comprising:
a mobile communications device in uplink communication with a serving base station; and
a non-serving base station in the vicinity of the mobile communications device;
wherein:
   the mobile communications device receives transmit diversity feedback from the serving and non-serving base stations based on diversity signals transmitted by the mobile communications device;
   the mobile communications device calculates a phase parameter based on the transmit diversity feedback from the serving base station in a direction opposite to a direction indicated by a phase feedback signal received from the non-serving base station by comparing power down commands received by the non-serving and serving base stations; and
   the mobile communications device transmits a diversity signal with said phase parameter.

17. The mobile transmit diversity system of claim 16, wherein the transmit diversity feedback from the serving and non-serving base stations comprise power feedback signals and phase feedback signals.

\* \* \* \* \*